United States Patent [19]

Caldwell

[11] 4,228,337
[45] Oct. 14, 1980

[54] METHOD OF ELECTROSLAG WELDING
[75] Inventor: Robert A. Caldwell, Waukesha, Wis.
[73] Assignee: Allis-Chalmers Corporation, Milwaukee, Wis.
[21] Appl. No.: 35,611
[22] Filed: May 3, 1979

Related U.S. Application Data
[62] Division of Ser. No. 914,360, Jun. 12, 1978.

[51] Int. Cl.$^3$ .............................................. B23K 9/18
[52] U.S. Cl. .......................... 219/73.1; 219/137 WM
[58] Field of Search ........... 219/73.1, 137 WM, 146.1, 219/146.24, 146.41

[56] References Cited

U.S. PATENT DOCUMENTS

| | | | |
|---|---|---|---|
| 1,689,577 | 10/1928 | Becket | 75/123 N X |
| 1,911,053 | 11/1929 | Brophy | 75/123 N |
| 3,162,751 | 12/1964 | Robbins | 219/137 WM |
| 3,368,887 | 2/1968 | Enis | 219/137 WM |
| 3,602,689 | 8/1971 | Heuschkel | 219/137 WM |
| 3,854,028 | 12/1974 | Uttrachi | 219/73.1 X |
| 3,875,363 | 4/1975 | Arikawa | 219/73.1 |
| 4,086,463 | 4/1978 | Omori | 219/73.1 X |
| 4,125,758 | 11/1978 | Oishi | 219/73.1 X |

OTHER PUBLICATIONS
Hobart Brothers, ELECTRODES, WIRE, FLUX by Hobart, Bulletin EW 442, May 1976, Troy, Ohio, p. 23.

Primary Examiner—Richard R. Kucia
Attorney, Agent, or Firm—Robert C. Jones

[57] ABSTRACT

A method of electroslag welding for use in the electroslag welding of high tensile strength members formed of low alloy steels of the family of steels which includes American Society of Testing Materials designation ASTM A516-76. The welding electrode used in the method has a chemical composition in which the carbon content and contaminants have been reduced to the very minimum possible, resulting in greater impact strength of the electroslag weld deposit. The welding electrode includes constituents of manganese, silicon, nickel and iron. The nickel and manganese content of the electrode are so proportioned as to compensate for loss of tensile strength in the electroslag weld deposit which would otherwise be caused by the minimal carbon content of the welding electrode, this proportioning of the nickel and manganese content of the welding electrode also maximizing impact strength and ductility of the weld deposit. When the electrode is used for the electroslag welding of low alloy, high tensile strength steel members, such as steels of the ASTM A516-76 family, the resulting electroslag weld deposit has a characteristic microstructure resulting in good tensile strength, high impact strength, and good ductility characteristics over a wide range of dilution of the weld deposit by the base metal, all without the necessity of an expensive and energy-consuming post-weld "normalizing" heat treatment as has been required in the prior art.

4 Claims, 17 Drawing Figures

METHOD OF ELECTROSLAG WELDING

This is a division, of application Ser. No. 914,360, filed June 12, 1978.

BACKGROUND OF THE INVENTION

1. Field of the Invention

This invention relates to a method of electroslag welding.

2. Description of the Prior Art

Difficulties have been encountered in the prior art when attempting to join by welding members formed of low alloy, high tensile strength steels of the family of steels which includes American Society of Testing Materials designations ASTM A516-76 (boiler or pressure vessel type steel), ASTM A572-76 (structural plate steel) and ASTM A216-75 (cast steel). In the prior art, when it has been attempted to provide an electroslag weld between steel members of the family of low alloy, high tensile strength steels such as those described, the resulting electroslag weld between the high tensile strength members has resulted in two basic problems, as follows:

(1) loss of impact strength in the weld deposit, i.e., poor resistance of the weld to low stress brittle fracture; and (2) low ductility of the weld.

The foregoing described undesirable characteristics of electroslag welds between members of low alloy, high tensile strength materials such as those enumerated could be overcome in the prior art only by the use of a prolonged post-weld "normalizing" high temperature heat treatment of the total welded part with subsequent cooling of the welded member in air or liquid. The purpose of this prior art post-weld normalizing heat treatment of the total welded part subsequent to the completion of the weld is to improve to acceptable values the mechanical properties of the weld deposit, including the tensile strength, impact strength, and ductility of the weld deposit. Typically, the prior art normalizing heat treatment just mentioned is conducted at a temperature such as 1600 degrees F. for a time period such as for four hours, after which the welded member is cooled by liquid or air to a temperature such as 400 degrees F.

It is obvious that the post-weld "normalizing" heat treatment required in the prior art in connection with welds in the ASTM A516-76 family of steels as just described is extremely expensive due both to furnace cost and to fuel cost, and to such an extent that such cost is prohibitive.

To the best of my knowledge, prior to my invention there was no welding electrode known or available which could be used for the electroslag welding of steels of the ASTM A516-76 family in which the resulting electroslag weld deposit did not require the post-weld high temperature normalizing heat treatment hereinbefore described in order to obtain acceptable mechanical properties in the weld deposit.

In addition to the "normalizing" post-weld heat treatment just described which was necessary in the prior art to obtain acceptable mechanical properties when welding low alloy, high tensile strength steel members of the type hereinbefore described, it is also the general practice to provide a stress relief heat treatment at a temperature such as 1150 degrees F. The purpose of the stress relief treatment is to equalize the tensile and compressive stresses set up during the welding operation. This stress relief treatment just described is standard practice subsequent to the completion of a weld and is utilized in welded members produced by use of the electrode and welding method of the present invention. However, as will be pointed out in more detail hereinafter, use of the welding electrode and welding method of the present invention eliminates the need for the extremely expensive and energy consuming high temperature (such as 1600 degrees F.) post-weld "normalizing" heat treatment of welded parts which has been required in the prior art for electroslag welds between low alloy, high tensile strength steels of the type hereinbefore described.

A problem which has presented itself in the prior art in connection with the formulation of welding electrode chemistry is the fact that a change in the electrode chemistry which tended to increase the impact strength of the resulting electroslag weld, such as a decrease in the carbon content of the welding electrode, at the same time tended to decrease the tensile strength of the resulting electroslag weld to an unacceptable value; and conversely, a change in the electrode chemistry, such as an increase in the carbon content of the electrode, which tends to increase the tensile strength of the resulting electroslag weld at the same time tends to decrease the impact strength of the resulting electroslag weld.

In this specification, in order to achieve brevity of expression, the abbreviation ASTM will be used to designate "American Society of Testing Materials." Also, the expression "A516-76 family" will be used to designate low alloy, high tensile strength steels of any of the types and ASTM designations just enumerated (i.e., ASTM A516-76, ASTM A572-76 and ASTM A216-75). Also, the abbreviation "PSI" will be used to designate "pounds per square inch."

STATEMENT OF THE INVENTION

Accordingly, it is an object of the present invention to provide a method of electroslag welding which has particular utility in connection with, although not necessarily restricted to, use in welding low alloy, high tensile strength steels of the family of steels which includes ASTM A516-76 steel and in which the resulting weld deposit or weld nugget has good tensile strength, high impact strength and good ductility characteristics, all without the necessity of an expensive and energy consuming post-weld "normalizing" heat treatment as has been required in the prior art.

In achievement of these objectives, there is provided in accordance with the invention a method of electroslag welding which has particular utility for use in the electroslag welding of members formed of low alloy high tensile strength steels of the family of steels which includes American Society of Testing Materials designation ASTM A516-76. The welding electrode used in the method has a chemical composition in which the carbon content and contaminants have been reduced to the very minimum possible, resulting in greater impact strength of the electroslag weld deposit. The welding electrode includes constituents of manganese, silicon, nickel and iron. The nickel and manganese content of the electrode are so proportioned as to compensate for loss of tensile strength in the electroslag weld deposit which would otherwise be caused by the minimal carbon content of the welding electrode, this proportioning of the nickel and manganese content of the welding electrode also maximizing the impact strength and ductility of the weld deposit. When the electrode is used for the electroslag welding of low alloy, high tensile strength steel members, such as steels of the ASTM A516-76 family, the resulting electroslag weld deposit has a characteristic microstructure resulting in good tensile strength, high impact strength, and good ductility characteristics over a wide range of dilutions of the weld deposit by the base metal, all without the necessity of an expensive and energy-consuming post-weld "normalizing" heat treatment as has been required in the prior art.

Further objects and advantages of the invention will become apparent from the following description taken in conjunction with the accompanying drawings in which:

BRIEF DESCRIPTION OF THE DRAWINGS

FIG. 4 also shows the location from which round tensile specimens of the type shown in FIG. 6 are removed from the electroslag weld deposit for use in making tests of tensile strength, yield strength, and percent elongation of the weld deposit;

DESCRIPTION OF THE PREFERRED EMBODIMENT

Figure 1:
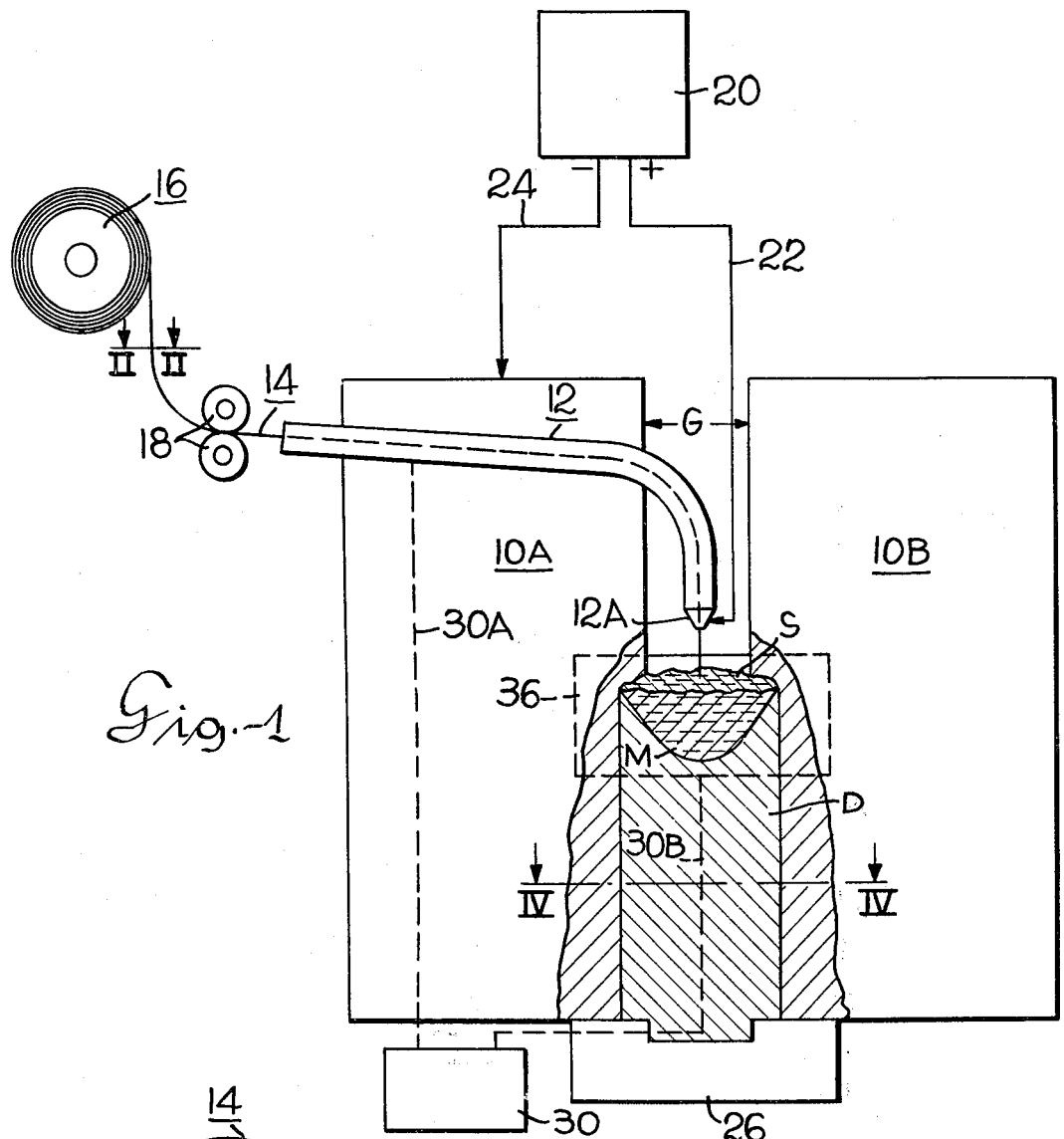
FIG. 1 is a diagrammatic view of an electroslag welding process using a nonconsumable nozzle.

Referring now to the schematic view of FIG. 1, there are shown two vertically positioned metal members respectively indicated at 10A and 10B and separated by the joint gap indicated at G. The gap G normally is of uniform width for the entire vertical height of members 10A and 10B. In the illustrated embodiment, the two metal members 10A, 10B which are to be welded together by an electroslag weld deposit are made of low alloy, high tensile strength steel of the family of steels which includes American Society of Testing Materials designation ASTM A-516-76 as hereinbefore defined.

The apparatus used for the electroslag welding operation includes a hollow tubular nozzle member formed of electrically conductive material and generally indicated at 12 and a wire-like welding electrode 14 having a chemical composition in accordance with the invention as will be described hereinafter. Nozzle 12 in the embodiment of FIG. 1 is of the nonconsumable type (i.e.—nozzle 12 is not consumed during the welding operation). The wire-like welding electrode 14 may typically be a tubular member $\frac{1}{8}$ inch in diameter and several hundred feet or more in length and wound on a spool generally indicated at 16. As seen in the cross-sectional view of FIG. 2, the welding electrode 14 comprises a hollow tubular sheath 14A formed of low carbon steel having a quantitative analysis such that no elements in the sheath 14A cause the limits of the electrode chemistry to be described hereinafter to be exceeded. Tubular sheath 14A of electrode 14 serves as an envelope or container for a core 14B formed of the various chemical elements of the electrode, the elements in core 14B being in granular form. The spooled electrode 14 may be supplied for use in a standard 55-pound package. Electrode 14 is threaded through drive rollers 18, driven by any suitable drive means, which feeds the electrode through hollow nozzle 12 at a predetermined controlled rate of speed, such as 100 inches per minute.

A suitable elevating and lowering mechanism diagrammatically indicated at 30 (FIG. 1) and which forms no part of the present invention is connected in operative relation to nozzle 12 as diagrammatically indicated by dotted line 30A and is effective to raise nozzle 12 and the electrode 14 moving in nozzle 12 directly upwardly in properly timed relation as the level of the weld deposit builds up, and also to lower nozzle 12 at the completion of a weld deposit, whereby to position nozzle 12 and electrode 14 in readiness to begin another weld deposit on other workpieces.

A suitable direct current power supply diagrammatically indicated at 20 is provided. An electrical conductor member 22 is connected at one end to the positive terminal of electrical power supply 20. The opposite end of conductor 22 is connected to an electrically conductive outlet guide member 12A positioned at the discharge end of nozzle 12. Guide member 12A is maintained in continuous electrical contact with the moving electrode 14. The negative terminal of DC power supply 20 is suitably connected by conductor 24 to the steel workpiece 10A which is to be welded to the steel workpiece 10B.

A suitable conducting member 26 underlies and is in contact with the lower end of the two workpieces 10A and 10B principally for the purpose of closing the lower end of gap G so that the molten metal of the weld deposit will not drop through the bottom of the gap. However, bridging member 26 also serves to provide an electrical connection between workpiece 10B and workpiece 10A to which the negative side of the power supply 20 is connected so that both workpieces 10A and 10B are electrically connected from the very beginning of the welding operation to the negative side of power supply 20.

It can be seen that there is a difference of electrical potential between welding electrode 14 and the two workpieces 10A and 10B. Typically, the difference in electrical potential between electrode 14 and workpieces 10A, 10B provided by direct current power supply 20 is 38 volts, with a typical current flow of 600 amperes during the electroslag welding process.

As best seen in the view of FIG. 1, the weld deposit D is gradually built up starting at the bottom end of the gap G between the two workpieces 10A and 10B, the heat of welding causing the wire-like welding electrode 14 to melt and also causing a region indicated at 10A' and 10B' (FIG. 4) of each of the respective workpieces 10A and 10B to also melt and to mix uniformly with the material of the welding electrode 14 to form a "puddle" of liquid metal M as indicated in FIG. 1. As the welding electrode 14 is gradually moved upwardly by elevating mechanism 30 from the lower end of gap G to the position shown in FIG. 1 which is intermediate the height of gap G, and also until the welding electrode 14 has moved to the upper end of the gap G, there is always a puddle of molten metal as indicated at M in FIG. 1 at the upper end of a deposit D of solidified solid metal below the puddle of liquid metal. The puddle of molten metal M is typically about 2 inches deep. The solidified deposit D is referred to as the "weld deposit" or as the "weld nugget." Typically, when welding two members such as 10A and 10B having a thickness T (FIG. 4) of 3 inches, and with a gap G which is 1¼ inches wide, the level of the welding deposit will rise at a rate of 0.5 inches per minute when electrode 14 is being dispensed at the rate of 100 inches per minute. Thus, with the assumed parameters just mentioned, it can be seen that 200 inches of electrode must be dispensed for a rise of 1 inch in the height of the weld deposit.

During the welding operation, the bottom tip of the wire-like welding electrode 14 is always so positioned relative to the welding deposit being formed that the bottom tip of the welding electrode is always immersed in the pool of molten slag S formed by the molten flux or "slag" which floats on the upper surface of the puddle of molten metal M.

Heat is evolved as the result of the passage of electrical current through the pool of molten slag S, raising the temperature of the molten slag S and of the puddle of molten metal M to a temperature in excess of 2700 degrees F. The quantity of heat evolved is a function of the welding voltage magnitude and of the welding current magnitude.

The flux is initially a dry powder-like material having a high percentage of silicon (Si). The flux changes from its powder-like initial state to a molten state during the course of the welding process and when in the molten state the flux is referred to as "slag."

During the welding operation, the layer of molten flux or "slag" indicated at S and which typically is about ¾ inch deep, always floats on the upper surface of the puddle of molten metal M. A welding flux having "basic" (as opposed to acidic) characteristics is used and may have a typical nominal chemistry as follows, with the various constituents of the flux having the percentages by weight of the total weight of the flux as indicated:

$SiO_2$—25%–30%
$CaO$—17%
$MnO$—15%–25%
$CaF_2$—30%–50%
$Al_2O_3$—2%
$Fe_2O_3$—2%

Basic fluxes of the general type just described are per se well known in the art and are commercially available.

Figure 2:
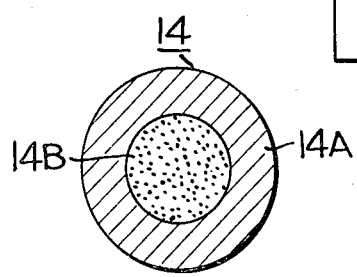
FIG. 2 is a view taken along line II—II of FIG. 1 showing a cross section of the welding wire or electrode.
Figure 4:
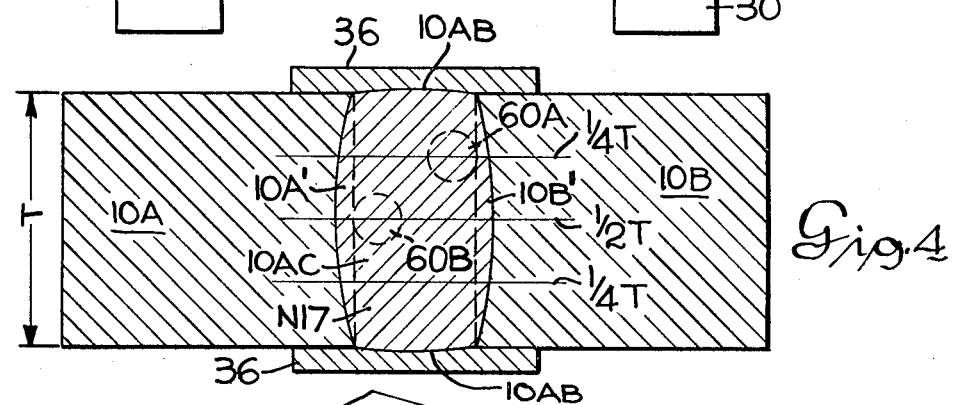
FIG. 4 is a view in horizontal cross section taken along line IV—IV of FIG. 1 of the weld deposit of FIG. 1.

The welding flux F serves to prevent oxidation of the exposed vertical surfaces 10AB, 10A'B' (FIG. 4) of the weld deposit, and also to prevent oxidation of the upper surface 10A'C' of the weld deposit, all these surfaces being shown in the view of FIG. 4. The flux F also serves to deoxidize the molten metal M of the weld puddle, thereby forming refractory-like oxides which form deposits of solidified slag on the oppositely-disposed outer surfaces 10AB and 10A'B' as seen in FIG. 2. When the molten slag S solidifies, the solidified slag which includes refractory-like oxides is chipped off of the outer surfaces of the solidified weld deposit or weld nugget D after the completion of the welding operation.

A pair of vertically movable oppositely disposed shoes 36 are provided contiguous the oppositely disposed lateral sides of gap G in the region of and in bounding relation to the puddle of molten metal M and to the pool of molten slag S, whereby to prevent spillage of the molten metal and of the molten slag. Shoes 36 are operatively connected to elevating and lowering mechanism 30 as diagrammatically indicated by the dotted line 30B, whereby shoes 36 are raised by mechanism 30B at the same rate as the upward movement of nozzle 12 and electrode 14, and whereby shoes 36 are always at the proper level to retain the molten metal M and molten slag S against spillage. Mechanism 30 also permits lowering of shoes 36 at the completion of the weld deposit, whereby shoes 36 are again properly located to retain the molten metal and the molten slag when another weld deposit is begun between two additional members to be welded.

Figures 3, 3A:
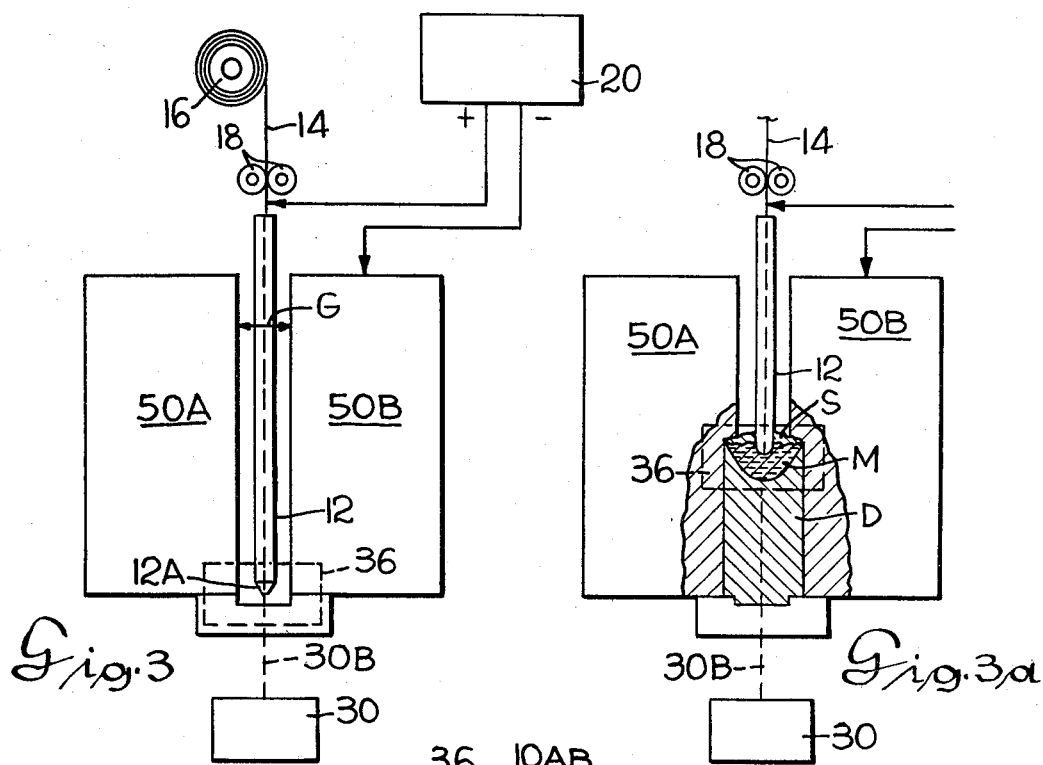
FIG. 3 is a diagrammatic view of an electroslag welding process using a consumable nozzle and showing the consumable nozzle and the wire-like electrode in a position corresponding to the beginning of the electroslag weld.
FIG. 3a is a diagrammatic view similar to FIG. 3 but showing the consumable nozzle and the wire-like electrode in a position corresponding to a partially completed weld deposit.

There is shown in FIGS. 3, 3A a pair of steel workpieces 50A and 50B made of steel of the family of steels which includes ASTM A516-76 (Grade 70) and which are being welded together by an electroslag welding process using a consumable nozzle in contrast to the method illustrated in FIG. 1 which employes a nonconsumable nozzle. It will be noted that a stationary consumable nozzle generally indicated at 12' extends vertically downwardly through gap G' between members 50A, 50B, and that a wire-like welding electrode 14, which is similar to the welding electrode 14 described hereinbefore in connection with the views of FIGS. 1 and 2, extends downwardly through the hollow interior of stationary consumable nozzle 12'.

Welding electrode 14 is unwound from a spool 16' and is threaded through suitable drive rollers 18', all in a manner similar to the arrangement described in connection with the embodiment of FIG. 1. Shoes 36' are connected to elevating and lowering mechanism 30' by the connection diagrammatically indicated at 30B', and shoes 36' are raised by mechanism 30' in properly timed relation whereby shoes 36' are always at the proper level to retain molten metal M and molten slag S against spillage, in the same manner as described in connection with the embodiment of FIG. 1. Welding electrode 14 is connected to the positive side of direct current power supply 20', and workpieces 50A-50B are connected to the negative side of power supply 20'.

The lower end 12A' of nozzle 12' and of welding electrode 14 within nozzle 12' are immersed in the pool of molten slag S' which floats on the upper surface of the pool of molten metal M' at the upper end of the solidified weld deposit or weld nugget D', in the same manner as described in connection with the nonconsumable nozzle arrangement of FIG. 1. In the consumable nozzle method shown in FIG. 4, the consumable hollow nozzle 12' melts and forms part of the puddle of molten puddle M' so that by the time the weld deposit has built up to the level of the upper end of gap G' all of the portion of the stationary consumable nozzle 12' which is positioned in gap G' has melted into the gradually rising puddle of molten metal M' at the upper end of the solidified deposit and has become part of the weld deposit. Since the consumable nozzle 12' of FIG. 4 is in substance a part of the electrode structure and the material of which consumable nozzle 12' is formed becomes part of the weld deposit, it follows that consumable nozzle 12' should be made of an electrically conductive material such as low carbon steel and should have no elements in its chemical composition which would cause the limits of the welding electrode chemistry of the present invention to be hereinafter set forth to be exceeded, or which would otherwise be inconsistent with the chemistry of the welding electrode of the present invention.

DETAILED DESCRIPTION OF THE WELDING ELECTRODE AND ITS CHEMISTRY

Welding electrode 14 has particular utility for use in electroslag welding although not necessarily restricted to use in electroslag welding and is also particularly adapted for, although not restricted to, use in the electroslag welding of steel members formed of low alloy, high tensile strength steels of the family of steels which includes American Society of Testing Materials designations ASTM A516-76, ASTM A572-76, and ASTM A216-75. For purposes of brevity, this family of steels will hereinafter be referred to as "steels of the ASTM A516-76 family."

Weld deposits No. N-17, No. N-18, and No. N-20 given hereinafter as Examples 1, 2, and 4 were all made on ASTM A516-76 (Grade 70) steel which has an ASTM description of "carbon steel plates for pressure vessels for moderate and lower temperature service."

Other steels in the ASTM A516-76 family include the following:

ASTM A572-76 having an ASTM description of "high strength low alloy Columbium-Vanadium steels of structural quality".

ASTM A216-75 (Grade WCC) having an ASTM description of "carbon steel casting suitable for fusion welding for high temperature service".

The electroslag welding electrode 14 of the invention has the following chemical composition:

| CONSTITUENT | PERCENT OF TOTAL WEIGHT OF ELECTRODE |
|---|---|
| Manganese (Mn) | About 1.90% to about 2.10% |
| Silicon (Si) | About 0.30% to about 0.45% |
| Nickel (Ni) | About 0.5% to about 1.5% but preferably about 0.9% to about 1.0% |
| Carbon (C) | 0.00% to about 0.05% |
| Phosphorus (P) | 0.00% to about 0.02% |
| Sulfur (S) | 0.00% to about 0.02% |
| Chromium (Cr) | 0.00% to about 0.03% |
| Molybdenum (Mo) | 0.00% to about 0.01% |
| Aluminum (Al) | 0.00% to about 0.01% |
| Copper (Cu) | 0.00% to about 0.03% |
| Titanium (Ti) | 0.00% to about 0.01% |
| Iron (Fe) | The remainder or balance of the total weight of the electrode is iron, and may be in the form of an iron powder |

The potential hydrogen content of the electrode shall be limited to at or under about ten parts per million (10.0 PPM). Oxygen in the electrode shall be limited to at or under about 1500 parts per million (1500 PPM).

It will be noted that the chemical constituents of the welding electrode 14 are manganese (Mn), silicon (Si), nickel (Ni), and iron (Fe), all in the various percentages by weight of the total electrode weight of the electrode 14 as given in the foregoing tabulation. In the illustrated embodiment shown in FIG. 2 of the drawings, the total weight of electrode 14 includes the weight of tubular sheath 14A and also the weight of core 14B of the electrode. Thus, the percent weight given in the foregoing tabulation is the percent weight of the respective chemical constituents relative to the weight of the total electrode, including the sheath 14A and the core 14B. As previously mentioned, sheath 14A is formed of low carbon steel having no elements therein in quantities such as to cause the limits of the electrode chemistry to be exceeded, since sheath 14A melts during the welding process and becomes part of the weld deposit D.

A very important feature of the inventive concept of the present invention is the fact that the carbon content of electrode 14 is reduced to the very minimum possible since the presence of carbon in the electrode tends to lower the impact strength of the resulting weld deposit as measured by the Charpy impact test as will be described hereinafter. Hence, reducing the carbon content of the welding electrode 14 to the very minimum possible aids in providing greater impact strength of the weld deposit. When the base metal which is being welded is a low alloy, high tensile strength steel of the family of steels to which ASTM A516-76 belongs, and having a relatively high carbon content therein, the effect of reducing to a minimum the carbon content of the welding electrode is that substantially all, although not necessarily entirely all, of the carbon content of the resulting electroslag weld deposit or weld "nugget" D is derived from the contribution of the melted base metal to the weld deposit, and there is a minimum contribution of carbon from the welding electrode 14 to the resulting electroslag weld deposit or weld nugget.

However, the minimization of the carbon content of the welding electrode 14, as just explained and as set forth in the foregoing tabulation of the chemistry of the welding electrode, which results in increasing the impact strength of the electroslag weld deposit would also normally tend to undesirably decrease the tensile strength of the resulting electroslag weld deposit or weld nugget. It might be noted at this point that it is extremely essential that the tensile strength of the electroslag weld deposit between two steel members being welded should never be less than the ASTM specified minimum tensile strength of the steel members being welded. Thus, for example, in welding two members manufactured of steel of the ASTM A516-76 (Grade 70) family which has an ASTM specified minimum tensile strength of 70,000 PSI, it is absolutely essential that the tensile strength of the electroslag weld deposit or nugget between such steel members should never be less than the ASTM specified minimum tensile strength of the two steel members being welded, namely, that the tensile strength of the electroslag weld should not, in this particular case, be less than 70,000 PSI. On the other hand, the tensile strength of the electroslag weld deposit, in the case just mentioned, can be greater than the ASTM specified minimum tensile strength of the two steel members being welded (i.e., the tensile strength of the weld deposit can be greater than 70,000 PSI).

It should be noted in this connection that if the workpieces are tested and found to have an actual tensile strength which is higher than the ASTM specified minimum strength for the steel of which the workpieces are made, it is acceptable for the electroslag weld deposit to have a tensile strength which is less than the actual tensile strength of the workpieces, as long as the tensile strength of the electroslag weld deposit is not less than the ASTM specified minimum tensile strength for the steel workpieces.

For example, if the steel workpieces which are being welded are of ASTM A516-76 (Grade 70) steel having an ASTM minimum tensile strength specified at 70,000 PSI, and these workpieces are tested and found to have an actual tensile strength of 75,000 PSI, in such case it is acceptable for the electroslag weld deposit between these workpieces to have a tensile strength of 72,000 PSI which is less than the actual tensile strength of the workpieces but which is not less than the 70,000 PSI ASTM minimum specified tensile strength of the workpieces.

A very significant feature of the chemical composition of the welding electrode as set forth in the foregoing tabulation is the presence of nickel (Ni) in the electrode composition and in the percentage range set forth. The nickel in the electrode composition serves to compensate for the loss of tensile strength of the electroslag weld deposit D which would otherwise be caused by reduction to a minimum of the carbon content of the electrode. The presence of nickel in the electrode composition also serves to increase the impact strength of the resulting electroslag weld deposit or weld nugget, reinforcing the improvement in impact strength of the electroslag weld deposit which is provided by the minimal carbon content of the welding electrode as hereinbefore described.

The nickel content of the welding electrode should not exceed about 1.5% of the total weight of the electrode since to exceed this percentage value might tend to promote solidification cracking of the resulting electroslag weld deposit.

The manganese (Mn) content of the electrode as set forth in the foregoing tabulation serves three functions, as follows: (1) the manganese serves as a deoxidizer in the puddle of molten metal M formed by the molten electrode 14 and by the molten base members being welded, which molten puddle hardens to form the electroslag weld deposit D; (2) the manganese also serves to supplement the previously described effect of the nickel content of the electrode in increasing the tensile strength of the resulting electroslag weld deposit to compensate for the decrease in tensile strength which would otherwise be caused by the minimal carbon content of welding electrode 14; and (3) as in the case with the nickel content of the welding electrode composition, the manganese content also tends to increase the impact strength of the resulting electroslag weld deposit to further supplement the increase in impact strength of the weld deposit which is caused by the minimal carbon content of the welding electrode.

The silicon content of the welding electrode 14 serves principally as a deoxidizer in the puddle of molten metal M which subsequently solidifies into the weld deposit, the presence of silicon in the welding electrode thereby helping to reduce the oxygen content of the resulting electroslag weld to a value which is at or below the oxygen content limit of 1500 parts per million set forth in the foregoing description of the chemistry of the welding electrode.

The remaining constituents (other than iron) listed in the foregoing tabulation of the chemistry of the welding electrode 14, namely, phosphorus (P), sulfur (S), chromium (Cr), molybdenum (Mo), aluminum (Al), copper (Cu), and titanium (Ti), are all contaminants which significantly impair the integrity and mechanical quality of the resulting electroslag weld, and all of these last-mentioned elements are maintained at the very minimal content possible in the welding electrode 14, as set forth in the limits defined in the foregoing tabulation of the chemistry of welding electrode 14. The absence of these contaminants further tends to enhance the impact and ductility properties of the electroslag weld deposit. Potential hydrogen and oxygen as constituents of the welding electrode are both also regarded as contaminants and should be limited to maximum values of 10.0 parts per million potential hydrogen and 1500 parts per million of oxygen in the welding electrode composition.

The sources of hydrogen contamination in the content of welding electrode 14 are such things as water moisture, rust, and oil. Hydrogen content in the welding electrode should be held to a minimal value as set forth in the foregoing tabulation since the presence of hydrogen causes hydrogen embrittlement of the weld deposit which results in loss of ductility and loss of tensile strength of the resulting electroslag weld deposit or weld nugget. The presence of oxygen in the welding electrode should be held to a maximum value of 1500 parts per million as set forth hereinbefore since oxygen is also a contaminant which can adversely affect the quality of the weld deposit. For example, oxygen can combine with carbon to form carbon monoxide (CO) which tends to cause porosity of the weld deposit.

In examining the results of the spectrographic analysis on the various specimens of the base metal ASTM A516-76 (Grade 70) on which weld deposits N-17, N-18, and N20 were made, it will be noted that the base metal contains only very small trace amounts of nickel so that substantially all of the nickel in the resulting weld deposits N-17, N-18, and N-20 is derived from the nickel content of the electrode. On the other hand, an examination of the spectrographic analysis of the base metal ASTM A516-76 (Grade 70) used in Examples 1, 2 and 4 (weld deposits N-17, N-18, and N-20) shows that there is a significant contribution in the weld deposits of manganese (Mn) and silicon (Si) from the base metal. There is also a substantial contribution in the weld deposits of carbon from the base metal. It also might be noted that since silicon has a greater affinity than manganese for oxidation, a relatively greater portion of silicon than of manganese will be oxidized during the welding process.

Figure 13:
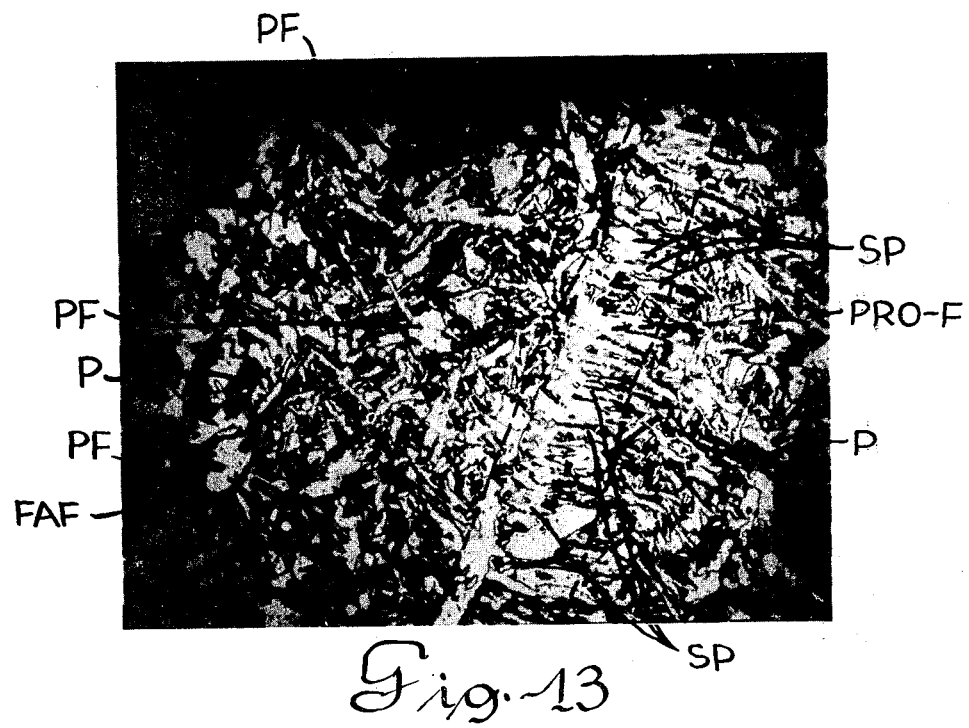
FIG. 13 is a microphotograph of the microstructure, magnified 250 times, of the weld deposit identified as No. N-17.
Figure 14:
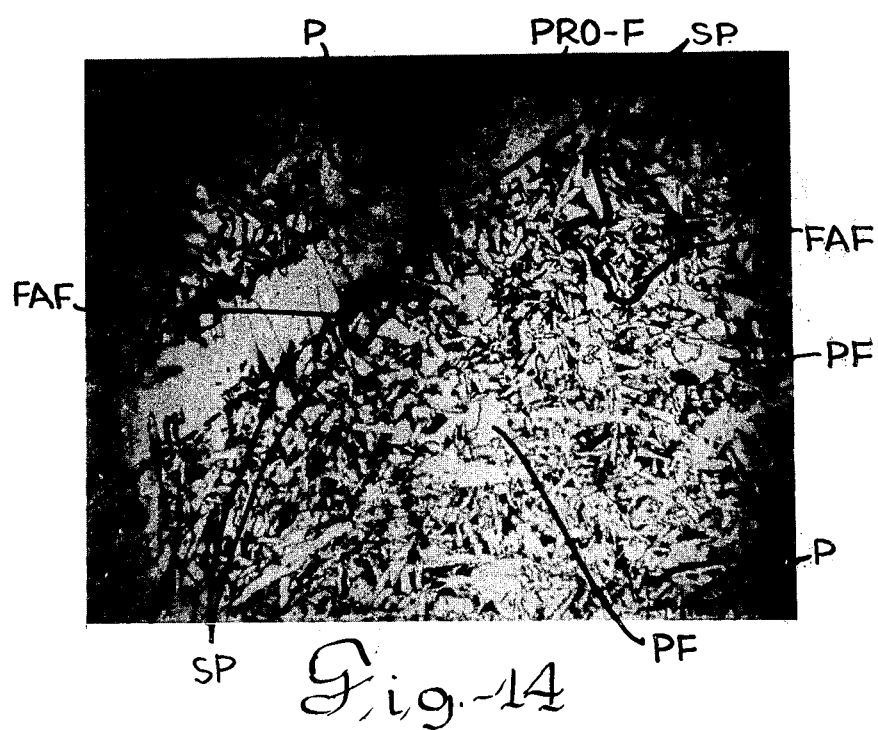
FIG. 14 is a microphotograph of the microstructure, magnified 250 times, of the weld deposit identified as No. N-18.
Figure 16:
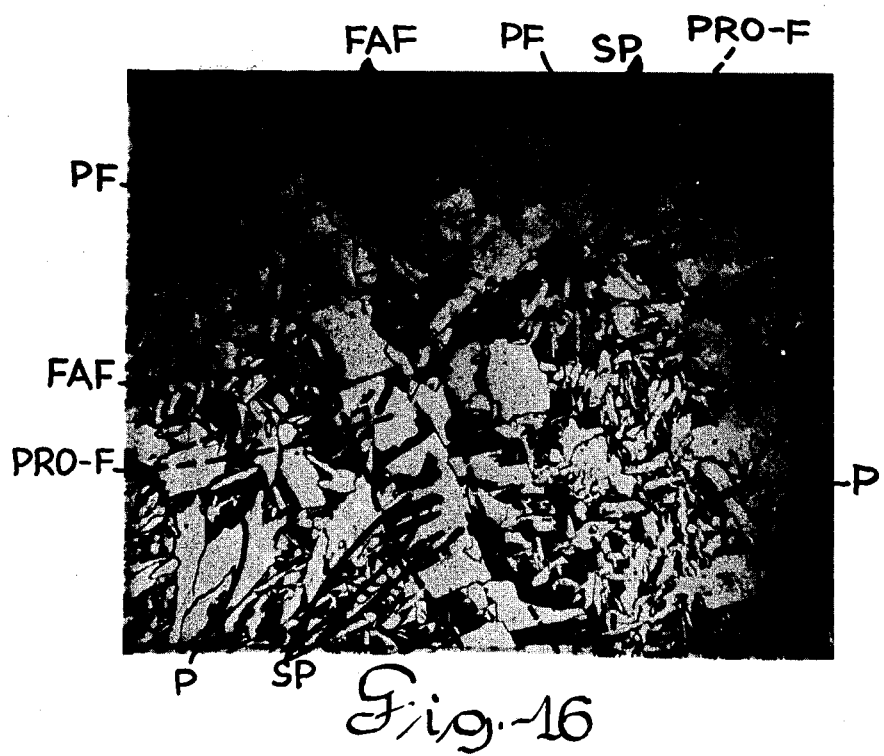
FIG. 16 is a microphotograph of the microstructure, magnified 250 times, of the weld deposit identified as No. N-20.

As shown in FIGS. 13, 14 and 16, which are microphotographs of the microstructures of the resulting electroslag weld deposits identified as Nos. N-17, N-18 and N-20, using a welding electrode of the invention having the chemistry as hereinbefore described, with all of the chemical constituents of the welding electrode being in the tolerance ranges set forth, and with the nickel content of the welding electrode being in the stated preferred range 0.9%–1.0% by weight of the total weight of the electrode. Each of the weld deposits Nos. N-17, N-18, and N-20 was respectively formed between two steel members of ASTM A516-76 (Grade 70) steel. Each of the weld deposits N-17, N-18, and N-20 has the following metallurgical constituents:

(1) Fine acicular ferrite, indicated at FAF in the microphotographs; this is a metallurgical microstructure which contributes high impact characteristics to the weld deposit;

(2) Polygonal ferrite, indicated at PF in the microphotographs;

(3) A minimum of pearlite; polygonal ferrite and pearlite are both types of metallurgical microstructures which are characteristic of weld deposits having low carbon content. There is inherently some pearlite in the metallurgical structure of the weld deposits. In the microphotographs, the pearlite is indicated at P.

(4) Proeutectoid ferrite having side plate formation; this is a metallurgical microstructure which imparts good ductility characteristics to the weld deposit. In the microphotographs, the proeutectoid ferrite is indicated at PRO-F, and the side plate formation is indicated at SP.

(5) Absence of Widmanstatten formation; the absence of Widmanstatten formation is a good quality in the metallurgical microstructure of the electroslag weld deposits since the presence of Widmanstatten formation causes lower ductility and decreased impact strength in the weld deposit.

Figure 15:
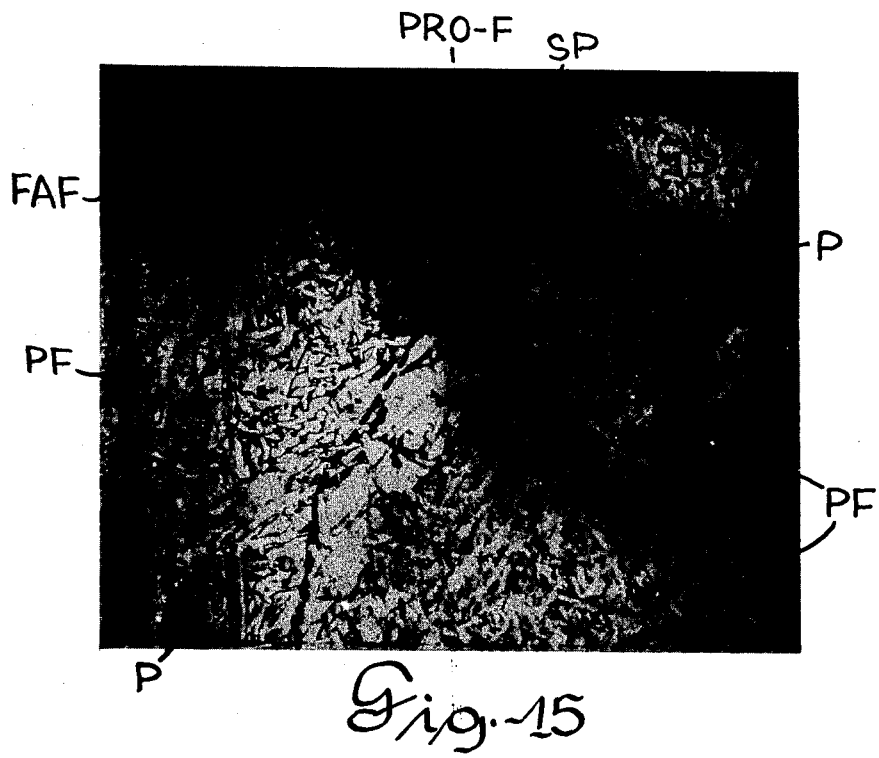
FIG. 15 is a microphotograph of the microstructure, magnified 250 times, of the weld deposit identified as No. N-19.

A microphotograph of weld deposit No. N-19 is shown in FIG. 15. Weld deposit No. N-19 was made on Allis-Chalmers Corporation designation ACM-0015 steel and using the welding electrode of the invention having the chemistry as hereinbefore described, with all of the chemical constituents of the welding electrode being in the tolerance ranges set forth hereinbefore, and with the nickel content of the welding electrode being in the stated preferred range 0.9%–1.0% by weight of the total weight of the electrode.

The metallurgical structure of weld deposit No. N-19 as shown in FIG. 15 is generally similar to that just described in connection with weld deposits Nos. N-17, N-18, and N-20 of FIGS. 13, 14 and 16.

The characteristics of a metallurgical microstructure of the type just defined and as shown in the microphotographs of FIGS. 13, 14, 15, and 16 are described in the publication "DeFerri Metallographia—Metallographic Atlas of Iron, Steels and Cast Irons," Vols. I, II, III; published by W. B. Saunders Company, Philadelphia, London; Copyright 1966 by The High Authority of the European Coal and Steel Community, Luxemburg.

The wire-like welding electrode 14 described hereinbefore and shown in cross-section in FIG. 2 may be defined as a "metal alloy core surrounded by a conductive sheath." In addition to having the chemical composition of the electrode, as hereinbefore defined, in an electrode of the type just mentioned and as shown in the cross-sectional view of FIG. 2, the welding electrode of the invention could also be formed as a solid wire—that is, the chemical specification hereinbefore defined could be contained in an electrode of solid wire form. If the electrode of the invention were to be required in a quantitatively large amount, it may be more practical to manufacture the electrode in the form of a solid wire.

If the welding electrode is formed as a solid wire, then the total weight of the electrode upon which the weight percentages of the various chemical constituents are based is the weight of the solid wire.

The identical electrode 14 may be used interchangeably in both the nonconsumable nozzle method of FIG. 1 and in the consumable nozzle method of FIGS. 3 and 3a, and irrespective of whether the electrode is of the alloy sheath-core type shown in FIG. 2 or whether the electrode is of the solid wire type. However, in using the consumable nozzle method of FIGS. 3 and 3a, a minor adjustment may have to be made in the welding parameters such as joint gap and applied voltage whereby to adjust the dilution of the electroslag weld deposit, as described hereinafter under the heading "Dilution of Electroslag Weld Deposit by Base Metal," to compensate for the fact that the material of the consumable nozzle melts and becomes part of the weld deposit.

The various forms just described which the welding electrode may assume are not intended to be restrictive as to the form which the welding electrode of the invention may assume since essentially it is only necessary that the welding electrode, whatever form it may assume, include the welding chemistry as hereinbefore set forth regardless of what particular form the welding electrode may assume.

DESCRIPTION OF TESTS ON ELECTROSLAG WELDS

Tests were made on four different electroslag weld deposits, respectively identified as weld deposits No. N-17, No. N-18, No. N-19 and No. N-20. In making each of the weld deposits No. N-17, No. N-18, No. N-19 and No. N-20, the welding electrode used was of the type shown in FIG. 2 of the drawings and manufactured to have an electrode chemistry according to the foregoing specification, with all of the chemical constituents of the welding electrode being in the tolerance ranges set forth hereinbefore, and with the nickel content of the welding electrode used in making each of the foregoing weld deposits being in the tolerance range 0.9% to 1.0% by weight of the total electrode weight. In making each of the weld deposits N-17, N-18, N-19 and N-20, the wire-like welding electrode was fed through a nonconsumable nozzle of the type shown in FIG. 1 of the drawings.

EXAMPLE 1

Weld deposit No. N-17 was made between two members formed of ASTM A516-76 (Grade 70) steel, of 3½ inches thickness, and with a gap G 1¼ inches wide between the members being welded. Weld deposit No. N-17 has approximately a 40%-50% dilution of the electroslag weld deposit by the base metal.

The following tests were conducted on the solidified electroslag weld deposit identified as No. N-17:

| KSI = thousands of pounds per square inch | ¼ T | ½ T |
|---|---|---|
| Tensile strength in KSI | 78.3 | 79.0 |
| Yield strength in KSI | 59.0 | 60.0 |
| % Elongation | 30.0 | 29.0 |

Charpy Impact Tests on Weld Deposit No. N-17

At 30 deg F.

| ¼ T | | ½ T | |
|---|---|---|---|
| Specimen | Ft-Lbs. | Specimen | Ft.-Lbs. |
| #1 | 59 | #1 | 69 |
| #2 | 90 | #2 | 71 |
| #3 | 117 | #3 | 87 |
| #4 | 120 | #4 | 102 |
| #5 | 121 | #5 | 146 |
| Average = 101.4 Ft.-Lbs. | | Average = 95 Ft.-Lbs. | |
| AWS Average = 109 Ft.-Lbs. | | AWS Average = 86.6 Ft.-Lbs. | | at 0 deg. F.

| Specimen | Ft.-Lbs. | Specimen | Ft.-Lbs. |
|---|---|---|---|
| #1 | 44 | #1 | 27 |
| #2 | 75 | #2 | 34 |
| #3 | 79 | #3 | 53 |
| #4 | 79 | #4 | 66 |
| #5 | 102 | #5 | 70 |
| Average = 75.8 Ft.-Lbs. | | Average = 50.0 Ft.-Lbs. | |
| AWS Average = 77.6 Ft.-Lbs. | | AWS Average = 51.0 Ft.-Lbs. | |

Bend tests conducted on electroslag weld deposit No. N-17 to help evaluate the ductility of the weld deposit:

| Sample No. | Type of Bends | Results |
|---|---|---|
| 17-(1-1) | Side bends | No visible defects |
| 17-(1-2) | Side bends | No visible defects |
| 17-(1-3) | Side bends | No visible defects |
| 17-(2-1) | Side bends | No visible defects |
| 17-(2-2) | Side bends | No visible defects |
| 17-(2-3) | Side bends | No visible defects |
| 17-(3-1) | Side bends | No visible defects |
| 17-(3-2) | Side bends | No visible defects |
| 17-(3-3) | Side bends | No visible defects |

The ASTM A516-76 (Grade 70) base metal on which electroslag weld No. N-17 was made, and also the electroslag weld deposit N-17 were both subjected to spectrographic analysis to determine the percentages by weight of the chemical constituents in the base metal and in the weld deposit, respectively, with the following results:

| Spectrographic Analysis | | |
|---|---|---|
| | Base Metal ASTM A516-76 (Grade 70) | Weld Deposit No. N-17 |
| C | 0.29 | 0.07 |
| Mn | 1.06 | 1.80 |
| P | 0.008 | 0.007 |
| S | 0.029 | 0.009 |
| Si | 0.21 | 0.18 |

-continued

| Spectrographic Analysis | | |
|---|---|---|
| | Base Metal ASTM A516-76 (Grade 70) | Weld Deposit No. N-17 |
| Ni | 0.06 | 0.83 |
| Cr | 0.11 | 0.12 |
| Mo | 0.01 | 0.03 |

EXAMPLE 2

Weld deposit No. N-18 was made between two members formed of ASTM A516-76 (Grade 70) steel, of 3½ inches thickness, and having a gap 1½ inches wide between the members being welded. Weld deposit No. N-18 had approximately a 30%-40% dilution of the electroslag weld deposit by the base metal.

The following tests were conducted on the solidified electroslag weld deposit No. N-18:

| | KSI = thousands of pounds per square inch | | | |
|---|---|---|---|---|
| | 18-A | 18-B | 18-C | 18-D |
| Tensile strength in KSI | 78.8 | 80.3 | 79.3 | 79.6 |
| Yield strength in KSI | 60.2 | 60.5 | 60.2 | 60.7 |
| % elongation | 28.5 | 26.5 | 29.0 | 28.0 |

Charpy Impact Tests on Weld Deposit No. N-18 at 30 deg. F.

| ¼ T | | ½ T | |
|---|---|---|---|
| Specimen | Ft.-Lbs. | Specimen | Ft.-Lbs. |
| #1 | 86 | #1 | 77 |
| #2 | 108 | #2 | 86 |
| #3 | 111 | #3 | 92 |
| #4 | 117 | #4 | 114 |
| #5 | 129 | #5 | 120 |
| Average = 110.2 Ft.-Lbs. | | Average = 97.8 Ft.-Lbs. | |
| AWS Average = 112.0 Ft.-Lbs. | | AWS Average = 97.3 Ft.-Lbs. | | at 0 deg. F.

| ¼ T | | ½ T | |
|---|---|---|---|
| Specimen | Fl-Lbs. | Specimen | Ft.-Lbs. |
| #1 | 46 | #1 | 52 |
| #2 | 57 | #2 | 54 |
| #3 | 99 | #3 | 83 |
| #4 | 103 | #4 | 102 |
| #5 | 138 | #5 | 134 |
| Average = 88.6 Ft.-Lbs. | | Average 85.0 Ft.-Lbs. | |
| AWS Average = 86.3 Ft.-Lbs. | | AWS Average = 79.6 Ft.-Lbs. | |

Bend tests conducted on electroslag weld deposit No. N-18 to help evaluate the ductility of the weld deposit:

| Sample No. | Type of Bends | Results |
|---|---|---|
| 18-(1-1) | Side bends | No visible defects |
| 18-(1-2) | Side bends | No visible defects |
| 18-(1-3) | Side bends | No visible defects |
| 18-(2-1) | Side bends | No visible defects |
| 18-(2-2) | Side bends | No visible defects |
| 18-(2-3) | Side bends | No visible defects |
| 18-(3-1) | Side bends | No visible defects |
| 18-(3-2) | Side bends | No visible defects |
| 18-(3-3) | Side bends | No visible defects |

The ASTM A516-76 (Grade 70) base metal on which electroslag weld deposit No. N-18 was made, and also the electroslag weld deposit No. N-18 were both subjected to spectrographic analysis to determine the percentages by weight of the chemical constituents in the base metal and in the weld deposit, respectively, with the following results:

| | Spectrographic Analysis | |
|---|---|---|
| | Base Metal ASTM A516-76 (Grade 70) | Weld Deposit No. N-18 |
| C | 0.29 | 0.06 |
| Mn | 1.06 | 1.58 |
| P | 0.008 | 0.011 |
| S | 0.029 | 0.011 |
| Si | 0.21 | 0.20 |
| Ni | 0.06 | 0.77 |
| Cr | 0.11 | <0.11 |
| Mo | 0.01 | 0.03 |

EXAMPLE NO. 3

Weld deposit No. N-19 was made between two members formed of Allis-Chalmers Corporation designation ACM-0015 steel. The ACM-0015 steel is similar to ASTM A285-75 (Grade B) which has an ASTM description "pressure vessel plates, carbon steel, low and intermediate tensile strength." The two members which were welded were of 2 inches thickness, and had a gap 1½ inches wide between the members being welded. Weld deposit No. N-19 had approximately a 30%–40% dilution of the electroslag weld deposit by the base metal.

The following tests were conducted on the solidified electroslag weld deposit identified as No. N-19:

| | KSI = thousands of pounds per square inch | | |
|---|---|---|---|
| | 19-A | 19-B | 19-C |
| Tensile strength in KSI | 75.1 | 71.5 | 71.6 |
| Yield strength in KSI | 57.2 | 42.5 | 40.5 |
| % elongation | 32.0 | 18.0 | 21.0 |

Charpy Impact Tests on Weld Deposit No. N-19 at 30 deg. F.

| Specimen | Ft.-lbs. |
|---|---|
| #1 | 76 |
| #2 | 79 |
| #3 | 101 |
| #4 | 120 |
| #5 | 127 | at 0 deg. F.

| Specimen | Ft.-lbs. |
|---|---|
| #1 | 62 |
| #2 | 70 |
| #3 | 71 |
| #4 | 92 |
| #5 | 103 | at −25 deg. F.

| Specimen | Ft.-lbs. |
|---|---|
| #1 | 41 |
| #2 | 50 |
| #3 | 55 |
| #4 | 57 |
| #5 | 81 |

Bend tests conducted on electroslag weld deposit No. N-19 to help evaluate the ductility of the weld deposit:

| Sample No. | Type of Bends | Results |
|---|---|---|
| 19-(1-1) | Side bend | No visible defects |
| 19-(1-2) | Side bend | No visible defects |
| 19-(2-1) | Side bend | No visible defects |
| 19-(2-2) | Side bend | No visible defects |
| 19-(3-1) | Side bend | No visible defects |
| 19-(3-2) | Side bend | No visible defects |
| 19-(4-1) | Side bend | No visible defects |
| 19-(4-2) | Side bend | No visible defects |

The base metal on which electroslag weld deposit No. N-19 was made, and also the electroslag weld deposit No. N-19 were both subjected to spectrographic analysis to determine the percentages by weight of the chemical constituents in the base metal and in the weld deposit, respectively, with the following results:

| | Spectrographic Analysis | |
|---|---|---|
| | Base Metal Allis-Chalmers ACM-0015 | Weld Deposit No. N-19 |
| C | 0.19 | 0.06 |
| Mn | 0.47 | 1.50 |
| P | 0.007 | 0.008 |
| S | 0.032 | 0.012 |
| Si | 0.16 | 0.20 |
| Ni | <0.01 | 0.65 |
| Cr | | <0.10 |
| Mo | | 0.02 |

EXAMPLE 4

Weld deposit No. N-20 was made between two members formed of ASTM A516-76 (Grade 70) steel of 5 inches thickness, and with a gap G 1½ inches wide between the members being welded. Weld deposit No. N-20 had approximately a 50% dilution of the electroslag weld deposit by the base metal.

The following tests were conducted on the solidified electroslag deposit identified as No. N-20:

| | 20-A | 20-B | 20-C | 20-D | 20-E |
|---|---|---|---|---|---|
| Tensile strength in KSI | 78.1 | 79.8 | 77.0 | 77.5 | 78.7 |
| Yield strength in KSI | 55.7 | 57.5 | 52.5 | 55.9 | 55.2 |
| % elongation | 27.0 | 28.5 | 39.0 | 40.0 | 38 |

Charpy Impact Tests on Weld Deposit No. N-20
All Specimens Taken from ¼ T Plane at 30 deg. F.

| Specimen | Ft.-lbs. |
|---|---|
| #1 | 28 |
| #2 | 33 |
| #3 | 48 |
| #4 | 66 |
| #5 | 75 | at 0 deg. F.

| Specimen | Ft.-lbs. |
|---|---|
| #1 | 14 |
| #2 | 17 |
| #3 | 19 |
| #4 | 33 |
| #5 | 67 | at −25 deg. F.

| Specimen | Ft.-lbs. |
|---|---|
| #1 | 9 |
| #2 | 9 |
| #3 | 9 |

| | -continued | |
|---|---|---|
| #4 | | 10 |
| #5 | | 11 |

Bend tests conducted on electroslag weld deposit N-20 to help evaluate the ductility of the weld deposit:

| Sample No. | Type of Bends | Results |
|---|---|---|
| 20-(1-1) | Side bends | No visible defects |
| 20-(1-2) | Side bends | No visible defects |
| 20-(1-3) | Side bends | No visible defects |
| 20-(1-4) | Side bends | No visible defects |
| 20-(2-1) | Side bends | No visible defects |
| 20-(2-2) | Side bends | No visible defects |
| 20-(2-3) | Side bends | No visible defects |
| 20-(2-4) | Side bends | No visible defects |
| 20-(3-1) | Side bends | No visible defects |
| 20-(3-2) | Side bends | No visible defects |
| 20-(3-3) | Side bends | No visible defects |
| 20-(3-4) | Side bends | No visible defects |
| 20-(4-1) | Side bends | No visible defects |
| 20-(4-2) | Side bends | No visible defects |
| 20-(4-3) | Side bends | No visible defects |
| 20-(4-4) | Side bends | No visible defects |

The base metal on which electroslag weld deposit No. N-20 was made, and also the electroslag weld deposit No. N-20 were both subjected to spectrographic analysis to determine the percentages by weight of the chemical constituents in the base metal and in the weld deposit, respectively, with the following results:

| | Spectrographic Analysis | |
|---|---|---|
| | Base Metal ASTM A516-76 (Grade 70) | Weld Deposit No. N-20 |
| C | 0.28 | 0.15 |
| Mn | 0.99 | 1.47 |
| P | 0.011 | 0.011 |
| S | 0.029 | 0.011 |
| Si | 0.21 | 0.17 |
| Ni | <0.06 | 0.49 |
| Cr | <0.11 | <0.11 |
| Mo | <0.01 | 0.02 |
| V | <0.01 | 0.01 |
| Cb* | <0.01 | <0.01 |
| Al | 0.023 | <0.003 |
| Ti | <0.01 | <0.01 |

*Columbium

The following comments are pertinent with respect to the foregoing test results on weld deposits No. N-17, N-18, N-19 and N-20:

It will be noted that the test results for weld deposit No. N-17 in the tabulation of results for tensile strength, yield strength and % elongation, there are two column headings as follows: "¼T" and "½T." From an examination of FIG. 4 of the drawings, it will be noted that "¼T" and "½T" designate the vertical planes in electroslag weld deposit No. N-17 from which the respective round tensile specimens 60A and 60B for use in performing the tensile strength, yield strength and % elongation tests made on weld deposit No. N-17 were obtained. Thus, the round tensile specimen indicated at 60A in FIG. 4 was removed from the vertical plane indicated at "¼T" and the round tensile specimen indicated at 60B in FIG. 4 was removed from the "½T" vertical plane of the electroslag weld deposit No. N-17. The round tensile specimens 60A and 60B are of the type illustrated by the specimen 60 in FIG. 6 of the drawings. It will be understood that more than one round tensile specimen may be removed from each of the respective vertical planes ¼T, ½T.

Figures 6, 7:
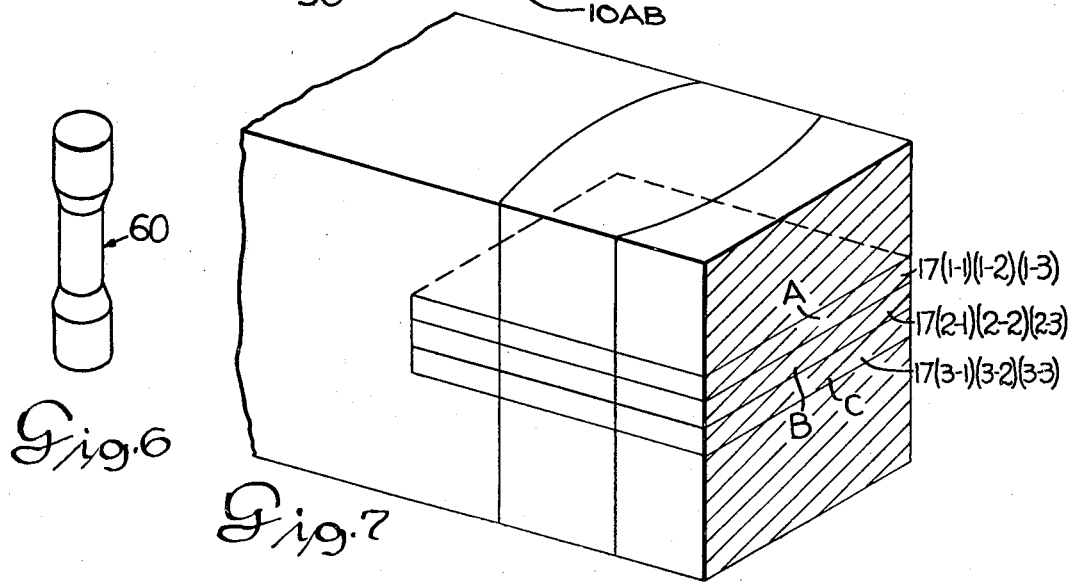
FIG. 6 is a perspective view of a round tensile specimen of the type used for making tests of tensile strength, yield strength, and percent elongation of the weld deposit.
FIG. 7 is a perspective view of the region of an electroslag weld deposit showing how a plurality of "sheets" of specimens are removed from the weld deposit for use in making bend tests on the electroslag weld, similar "sheets" being used for obtaining specimens for the Charpy impact test, and also for obtaining reduced section tensile specimens.
Figure 8:
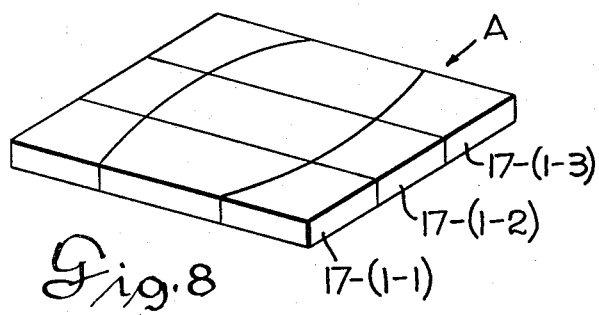
FIG. 8 is a perspective view of one of the specimen "sheets" of FIG. 7 used for providing bend test specimens.

FIG. 7 illustrates the manner in which the specimens used in the side bend tests for the weld deposits N-17, N-18, N-19 and N-20 were obtained. Thus, it will be noted that three immediately vertically superposed layers or "slices" of material are cut from the electroslag weld deposit, these respective layers in FIG. 7 being identified as A, B and C. Each of the layers or "slices" of a given weld deposit are then cut into strips such as those indicated at 17-(1-1), 17-(1-2), and 17-(1-3) of the layer or "slice" indicated at "A" in FIGS. 7 and 8. The uppermost layer A thus serves as a source for the side bend specimen 17-(1-1), specimen 17-(1-2) and specimen 17-(1-3). Similarly, the layer designated at B provides the side bend specimens 17-(2-1), 17-(2-2) and 17-(2-3); and in a similar manner, the layer indicated at C in FIG. 7 provides the side bend specimens 17-(3-1), 17-(3-2) and 17-(3-3). FIG. 8 is a perspective view of one of the layers such as the layer A of FIG. 7 which is cut as shown in FIG. 8 into the three specimens 17-(1-1), 17-(1-2) and 17-(1-3). The side bend specimens from weld deposits N-18, N-19 and N-20 were obtained in a similar manner to that just described.

Figure 9:
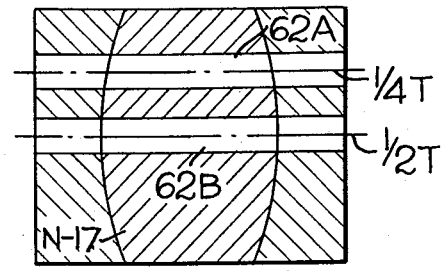
FIG. 9 is a view showing a "sheet" from which specimens are removed on which Charpy impact tests are performed to test the resistance of the electroslag weld deposit to low stress brittle fracture in accordance with procedures established by the American Society of Mechanical Engineers and by the American Welding Society.

FIG. 9 illustrates a slice taken from weld deposit N-17 in a manner similar to the previously-described slices A, B and C with two of the specimens indicated at 62A, 62B on which Charpy impact tests were performed being removed from slice D.

Figure 10:
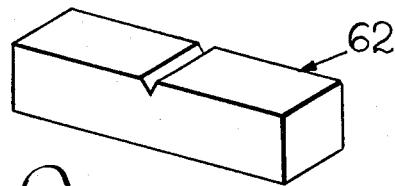
FIG. 10 is a perspective view of a specimen shown in FIG. 9 used for making Charpy impact tests on the weld deposit.

Thus, the Charpy impact test specimen indicated at 62B is cut from slice D at a location such that weld specimen 62B has its centerline lying in the vertical plane indicated at ½T which lies in the center of the front-to-rear dimension of the slice D and of the electroslag weld deposit N-17. The Charpy impact test specimen indicated at 62A has its centerline lying in the vertical plane indicated at ¼T which is one-fourth the distance from the rear to the front (relative to the view of FIG. 9) of the slice D and of the electroslag weld deposit shown in FIG. 9. The two specimens 62A and 62B of FIG. 9 are similar to the specimen indicated at 62 in FIG. 10. Specimens of the type indicated in FIGS. 9 and 10 were also used in the Charpy impact tests performed on weld deposits Nos. N-18, N-19 and N-20. The Charpy impact test specimens for weld deposit No. N-18 were taken from the planes ¼T and ½T as indicated in the test data for weld No. N-18. The Charpy impact test specimens for weld deposit No. N-19 were taken from planes of weld deposit No. N-19 such as ¼T and/or ½T as indicated in FIG. 9. The Charpy impact test specimens for weld deposit No. N-20 were all taken from the vertical plane ½T of weld deposit N-20.

Round tensile specimens of the type illustrated in FIGS. 4 and 6 such as the specimens indicated at 60A and 60B in FIG. 4 and at 60 in FIG. 6 were used on all of the tensile strength, yield strength and % elongation tests for both the weld deposits N-17 and N-18, for the tests under the column heading "19A" in Example 3 for weld deposit No. N-19, and also for the tensile tests under the column headings 20A, 20B made on weld deposit No. N-20. However, the tensile strength test, the yield strength test and the % elongation results under the column headings "19-B" and "19-C" for weld deposit No. N-19 and under the column headings 20-C, 20-D and 20-E for weld deposit No. N-20 were performed on a reduced section tensile specimen of the type shown in FIGS. 11 and 12.

Figure 11:
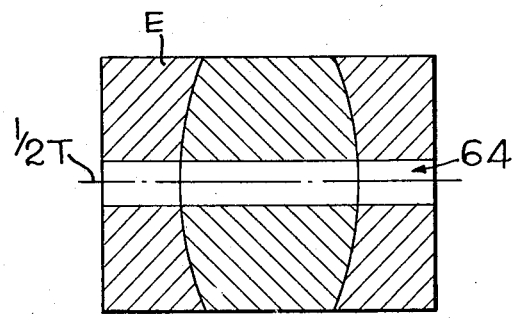
FIG. 11 is a view showing a "sheet" from which a reduced section tensile specimen is removed for use in making tests of tensile strength, yield strength, and percent elongation of the weld deposit.
Figure 12:
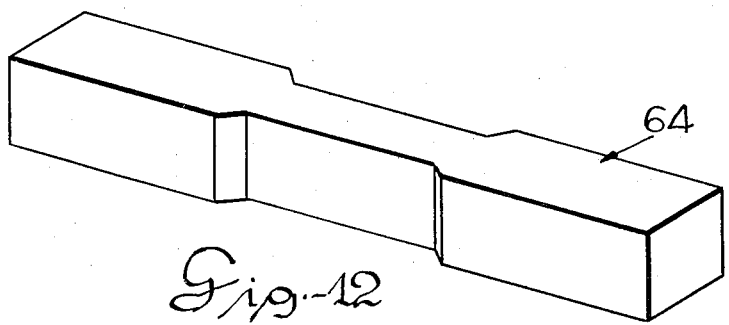
FIG. 12 is a perspective view of the reduced section tensile specimen shown in FIG. 11.

FIGS. 11 and 12 illustrate the location and type of reduced section tensile specimen used in connection with the tensile strength test, the yield strength test and the % elongation test tabulated under the column headings 19-B and 19-C of Example 3 relating to weld deposit No. N-19 and under the column headings 20-C, 20-D, 20-E relating to weld deposit No. N-20. Thus, as seen in FIG. 11, the reduced section tensile specimen indicated at 64 in FIG. 11 lies along the centerline ¼T of slice E and of the electroslag weld deposit shown in FIG. 11. A perspective view of the specimen indicated at 64 is shown in FIG. 12.

It might be noted that in connection with each of the Charpy impact tests for the weld deposits No. N-17 and N-18 two "averages" are given. Thus, for example, considering the first set of Charpy impact tests made on weld deposit No. N-17 at 30 degrees F. on the specimens taken from along the ¼T line (FIG. 9): one average is obtained by adding all of the readings in ft.-lbs. for the five test specimens Nos. 1–5, inclusive, and then dividing by 5 to give the "average"=101.4 ft.-lbs. The other average which is referred to as the "AWS Average" is obtained in accordance with the standards set forth by the American Welding Society by discarding the low reading and the high reading of the Charpy impact test results on the five specimens and then taking the average of the three remaining readings. By utilizing this method of obtaining an average, the result "AWS Average"=109 ft.-lbs. is obtained. This is illustrative of the manner of obtaining the two averages given in connection with the various Charpy impact tests on the various weld deposits.

The various tests hereinbefore described were conducted in accordance with procedures and standards set up as follows:

The tests on tensile strength, yield strength and % elongation and the side bend tests were conducted in accordance with standards and procedures set forth in the American Society of Mechanical Engineers Boiler and Pressure Vessel Code, Section IX, QW-462.1(a), 1977, and Section IX, QW-466, 1977.

The Charpy Impact Tests were conducted in accordance with procedures and standards set forth in American Society of Mechanical Engineers Boiler and Pressure Vessel Code, Subsection A-General Requirements-Section VIII, Division 1, 1977 edition. All of the foregoing American Society of Mechanical Engineers publications are published by the American Society of Mechanical Engineers, 345 East 47th Street, New York, New York 10017.

The standards and procedures for conducting the Charpy Impact Tests which were conducted are also set forth in the "Structural Welding Code" of the American Welding Society, (AWS D.1-1), Appendix C, entitled "Impact Strength Requirements for Electroslag and Electrogas Welding," 1976 revisions, published by the American Welding Society, Inc., 2501 N.W. 7th Street, Miami, Florida 33125.

It might be noted that the yield strength or yield point of the electroslag weld deposit is the tensile stress in pounds per square inch at which elongation of the test specimen first occurs. The yield point corresponds to the point Y on the stress-strain curve of FIG. 5.

Figure 5:
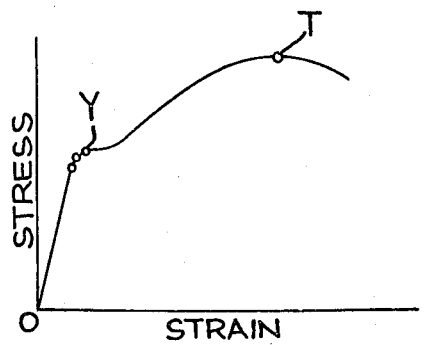
FIG. 5 is a graph in which tensile stress on the weld deposit is plotted against strain or elongation of the weld deposit.

The tensile strength of the electroslag weld as set forth in the foregoing test results is the peak or maximum value of tensile strength determined during the application of tensile stress on the test specimen and corresponds to the point T in the stress-strain curve of FIG. 5 of the drawings.

The percent elongation of the electroslag weld deposits as measured by the foregoing test results is the percentage increase in length of the test specimen at the time when fracture of the test specimen such as the specimen 60 of FIG. 6 or the specimen 64 of FIG. 12 occurs (i.e., elongation of the specimen at the time of fracture as compared to the original length of the specimen). The percentage elongation of the specimen is an indication of the ductility of the electroslag weld. The bend tests are also an indication of the ductility of the electroslag weld.

It will be noted that weld deposits N-17, N-18 and N-20 were made on ASTM A516-76 (Grade 70) steel. The test results indicate that electroslag weld deposits N-17, N-18 and N-20 made using the electrode of the invention are of such high quality with respect to the impact strength, tensile strength, and ductility of these weld deposits that no post-weld high temperature "normalizing" heat treatment of these weld deposits is necessary, as would have been required using welding electrodes of the prior art.

It will be noted that weld deposit N-19 was made on steel having Allis-Chalmers Corporation designation ACM-0015 which is similar to ASTM A-285, grade B steel having a nominal ASTM minimum tensile strength rating of 50,000 PSI. While prior art welding electrodes have been known which when used on steel such as Allis-Chalmers Corporation ACM-0015 have resulted in weld deposits having mechanical properties which were acceptable without the necessity of post-weld "normalizing" heat treatment, the test results in weld deposit No. N-19 on the ACM-0015 steel indicate that weld deposit No. N-19 made with the welding electrode of the present invention is superior in mechanical qualities such as impact strength, tensile strength, and ductility to welds made on this type of steel with welding electrodes of the prior art.

None of the weld deposits N-17, N-18, and N-20 hereinbefore described or the steel members joined by these weld deposits was given any high temperature "normalizing" post-weld heat treatment of the type used in the prior art to obtain acceptable mechanical properties in electroslag weld deposits made on steels of the ASTM A516-76 family, as described in the introductory portion of this specification. Also, no "normalizing" post-weld heat treatment was used in weld deposit N-19 which was made on Allis-Chalmers designation ACM-0015 steel, or on the steel members, joined by weld deposit N-19. However, all of the weld deposits N-17, N-18, N-19, and N-20 and the steel members joined by these weld deposits were subjected to a post-weld stress-relief heat treatment at a temperature of 1150 degrees F. to equalize the tensile and compressive stresses set up during the welding operation as described in the introductory part of this specification.

Dilution of Electroslag Weld Deposit by Base Metal

It has been previously pointed out that the molten puddle of metal which subsequently solidifies into the electroslag weld deposit is formed not only from the molten welding electrode material but is also formed by portions of the base metal (i.e., the metal being welded) which melts during the electroslag welding process and forms part of the molten puddle which becomes the solidified weld deposit. Thus, as explained in connection with the view of FIG. 4, the areas indicated at 10A' and 10B' in FIG. 4 represent regions of the original base metal which have melted during the welding process and have formed part of the weld deposit, the melted material of the base metal being uniformly distributed throughout the entire volume of the weld deposit, and with the resulting weld deposit filling the regions indicated at 10A' and 10B' which were formerly occupied by the base metal of the members 10A and 10B which are being welded.

The "percent dilution" of a given electroslag weld deposit is the percent of the weight of the electroslag weld deposit which is contributed by the base metal (i.e., the members such as 10A and 10B of FIG. 1) which are being welded. Thus, for example, a "20% dilution" means that 20% of the total weight of the electroslag weld deposit is contributed by the material of the base metal and that the remaining 80% of the total weight of the electroslag weld deposit is contributed by the material of the welding electrode.

The chemical composition of the welding electrode of the invention, as previously defined hereinafter, is particularly adapted for use in a dilution range of 30%–40% when operating on base metals of the ASTM A516-76 family as previously defined. A dilution range of 30%–40% is considered the optimum range of dilutions from the standpoint of ease of production when operating on this family of steels (i.e.—from the welding operator's viewpoint), although a dilution range of 20%–30% is preferable from the standpoint of obtaining optimum mechanical properties in the weld deposit. However, the welding electrode of the invention, as hereinbefore defined, has a chemical composition such that the electrode will provide acceptable electroslag weld deposits, although not always necessarily optimum electroslag weld deposits, over a range of dilutions from 10% to 60%.

The nominal chemistry of ASTM A516-76 (Grade 70) steel has maximum and minimum tolerance limits on the chemical composition thereof and the following table is a table of calculated welding deposit chemistries under four different dilution conditions at which acceptable weld deposit chemistries are obtained as follows:

(1) 40% dilution of anticipated maximum tolerance ASTM A516-76 (Grade 70) steel;
(2) 20% dilution of anticipated maximum tolerance ASTM A516-76 (Grade 70) steel;
(3) 40% dilution of anticipated minimum tolerances ASTM A516-76 (Grade 70) steel; and
(4) 20% dilution of anticipated minimum tolerance ASTM A516-76 (Grade 70) steel.

In making the following computations, aluminum in the weld deposit has been factored by 0.5 to allow for normal oxidation during welding.

TABLE 1

| Weld Deposit Chemistry at 40% Dilution | Anticipated A516-76 (Grade 70) max. |
|---|---|
| C-0.14 | C-0.31 |
| Mn-1.70 | Mn-1.25 |
| Si-0.32 | Si-0.21 |
| Ni-0.70 | Ni-0.25 |
| Cr-0.08 | Cr-0.16 |
| Mo-0.03 | Mo-0.07 |
| Al-0.012 | Al-0.043 |
| Cu-0.10 | Cu-0.22 |

TABLE 2

| Weld Deposit Chemistry at 20% Dilution | Anticipated A516-76 (Grade 70) max. |
|---|---|
| C-0.087 | C-0.31 |
| Mn-1.85 | Mn-1.25 |
| Si-0.36 | Si-0.21 |
| Ni-0.85 | Ni-0.25 |
| Cr-0.05 | Cr-0.16 |
| Mo-0.02 | Mo-0.07 |
| Al-0.008 | Al-0.043 |
| Cu-0.07 | Cu-0.22 |

TABLE 3

| Weld Deposit Chemistry at 40% Dilution | Anticipated A516-76 (Grade 70) min |
|---|---|
| C-0.09 | C-0.19 |
| Mn-1.52 | Mn-0.80 |
| Si-0.29 | Si-0.13 |
| Ni-0.60 | Ni-0.01 |
| Cr-0.02 | Cr-0.01 |
| Mo-0.014 | Mo-0.02 |
| Al-0.019 | Al-0.08 |
| Cu-0.026 | Cu-0.02 |

TABLE 4

| Weld Deposit Chemistry at 20% Dilution | Anticipated A516-76 (Grade 70) min. |
|---|---|
| C-0.056 | C-0.19 |
| Mn-1.76 | Mn-0.80 |
| Si-0.34 | Si-0.13 |
| Ni-0.80 | Ni-0.01 |
| Cr-0.02 | Cr-0.01 |
| Mo-0.012 | Mo-0.02 |
| Al-0.012 | Al-0.08 |
| Cu-0.028 | Cu-0.02 |

All of the foregoing tables 1, 2, 3 and 4 are based upon the assumption that the welding electrode has an electrode chemistry in accordance with the electrode chemistry of the invention as previously defined, including a nickel content of 0.9%–1.0%. Tables 1 and 2 assume that the electroslag weld deposit is made on a base member of ASTM A516-76 (Grade 70) steel in which the various chemical constituents of the steel are at the maximum or upper end of the range of their nominal range of tolerances. Table 1 shows the calculated weld deposit chemistry at 40% dilution, and Table 2 shows the calculated weld deposit chemistry at 20% dilution.

Tables 3 and 4 assume that the electroslag weld deposit is made on base members of ASTM A516-76 (Grade 70) steel in which the various chemical constituents of the steel are at the lower end or minimum end of their nominal range of tolerances. Table 3 shows the calculated weld deposit chemistry at 40% dilution and Table 4 shows the calculated weld deposit chemistry at 20% dilution.

Dilution of the electroslag weld deposit can be controlled approximately by (1) control of the joint gap between the members being welded (i.e.—the wider the joint gap, the lower the percent dilution, and the narrower the joint gap, the greater the percent dilution; (2) by control of the welding voltage; by increasing the welding voltage, the percent dilution is increased; by reducing the welding voltage, the percent dilution is reduced; and (3) by a combination of the controls (1) and (2) just enumerated. However, the factors just mentioned are difficult to precisely control due to meter errors in measuring applied voltage and also due to dimensional tolerances of the members being welded, and additionally, because of human errors.

In connection with the foregoing discussion of the dilution of the electroslag weld deposit by the base metal which is being welded, it might be mentioned that some workers in the electroslag welding art have taught that the percent dilution of the electroslag weld by the base metal should be purposely kept at a low value such as 5%–10% in order to limit the carbon content of the resulting electroslag weld. However, it is difficult to consistently obtain such a low dilution range as that just mentioned, and furthermore various problems occur when such a low weld dilution range is attempted.

While the welding electrode of the invention has been described as being used in connection with an electroslag welding process and has particular utility when used in such process, it is also within the scope of the present invention to utilize the welding electrode of the invention in other types of welding processes, such as, for example, in an electric arc welding process.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property of privilege is claimed are defined as follows:

1. The method of electroslag welding steel members of the ASTM A516-76 family which comprises the steps of (1) positioning said steel members to have a joint gap therebetween prior to the welding operation, (2) using in association with a welding flux a welding electrode having the following alloying constituents by percent weight of the weight of the total electrode:

About 1.90% to about 2.10% manganese
About 0.30% to about 0.45% silicon
About 0.5% to about 1.5% nickel, and in which the weight of the carbon content of said welding electrode does not exceed about 0.05% of the total weight of said electrode, and in which substantially the entire balance of the weight of said electrode is iron; (3) applying a direct current voltage between said electrode and said steel members whereby to cause said electrode and a portion of said steel members contiguous said joint gap to melt to form a puddle of molten metal, with a puddle of molten slag formed by said welding flux being superposed above said puddle of molten metal, with the joint gap between said steel members and the applied direct current voltage between said electrode and said steel members being parameters which may be controlled to control the percentage dilution of the electroslag weld deposit; and (4) correlating the values of said parameters to obtain a dilution of said electroslag weld deposit in the range of about 20% to about 50%.

2. The method of electroslag welding defined in claim 1 in which the nickel content of said electrode has a weight which is about 0.9% to about 1.0% of the total weight of said electrode.

3. The method of electroslag welding defined in claim 1 in which the chemical composition of said electrode is such that said electrode is particularly adapted for use in a dilution range of 30%–40%.

4. The method of electroslag welding steel members of the ASTM A516-76 family which comprises the steps of (1) positioning said steel members to have a joint gap therebetween prior to the welding operation, (2) using in association with a welding flux a welding electrode having the following alloying constituents by percent weight of the weight of the total electrode:

About 1.90% to about 2.10% manganese
About 0.30% to about 0.45% silicon
About 0.5% to about 1.5% nickel, and in which the weight of the carbon content of said welding electrode does not exceed about 0.05% of the total weight of said electrode, and in which the respective weights of the following elements do not exceed the following percentages of the weight of the total electrode:

Phosphorus: about 0.02%
Sulfur: about 0.02%
Chromium: about 0.03%
Molybdenum: about 0.01%
Aluminum: about 0.01%
Copper: about 0.03%
Titanium: about 0.01% and in which the hydrogen content of said electrode does not exceed about 10.0 parts mer million and the oxygen content of said electrode does not exceed about 1500 parts per million; and in which substantially the entire balance of the weight of said electrode is iron, and (3) applying a direct current voltage between said electrode and said steel members whereby to cause said electrode and a portion of said steel members contiguous said joint gap to melt to form a puddle of molten metal, with a puddle of molten slag formed by said welding flux being superposed above said puddle of molten metal, with the joint gap between said steel members and the applied direct current voltage between said electrode and said steel members being parameters which may be controlled to control the percentage dilution of the electroslag weld deposit; and (4) correlating the values of said parameters to obtain a dilution of said electroslag weld deposit in the range of about 20% to about 50%.

* * * * *